United States Patent [19]

Feezor et al.

[11] Patent Number: 4,748,908
[45] Date of Patent: Jun. 7, 1988

[54] WASTE CONTAINERS HAVING COMPRESSED WASTE HOLD-DOWN MECHANISMS

[75] Inventors: George F. Feezor, Lexington; David G. Gephart, Hillsborough; Bobbie D. Mauldin, Lexington, all of N.C.

[73] Assignee: Fab Masters, Inc., Lexington, N.C.

[21] Appl. No.: 817,220

[22] Filed: Jan. 7, 1986

[51] Int. Cl.[4] .................... B30B 15/10; G21C 19/00
[52] U.S. Cl. .................... 100/219; 100/194; 376/272; 292/219
[58] Field of Search .............. 376/272, 261, 260, 446; 250/506.1, 507.1; 100/219, 220, 245, 295, 194; 141/71, 73; 292/219, 220

[56] References Cited

U.S. PATENT DOCUMENTS

| | | | |
|---|---|---|---|
| 1,946,833 | 2/1934 | Brown | 292/219 |
| 3,172,168 | 3/1965 | Suska | 292/219 |
| 3,607,639 | 9/1971 | Van Santen | 376/446 |
| 3,811,719 | 5/1974 | McBurnie et al. | 292/219 |
| 3,894,761 | 7/1975 | Brennan, Jr. | 292/DIG. 36 |
| 4,095,521 | 6/1978 | Hauptman | 100/219 |
| 4,289,291 | 9/1981 | Goddard | 376/260 |
| 4,426,927 | 1/1984 | Teague | 100/245 |
| 4,462,310 | 7/1984 | Jackson et al. | 100/219 |
| 4,489,038 | 12/1984 | Nylund | 376/446 |
| 4,564,469 | 1/1986 | Cochet et al. | 100/219 |

FOREIGN PATENT DOCUMENTS 2729614  1/1979  Fed. Rep. of Germany ...... 376/272

OTHER PUBLICATIONS

"Mobile Supercompactors Meet Pressing Need", NEI, pp. 23-24, May 1985.

Primary Examiner—Deborah L. Kyle
Assistant Examiner—Daniel Wasil
Attorney, Agent, or Firm—Dowell & Dowell

[57] ABSTRACT

Contaminated waste containers having one or more internally disposed waste compression frames which are locked into position within the containers by resiliently biased hold-down mechanisms oriented within guide channels which extend along the side walls of the containers. Each of the frame guide channels is selectively provided with a supplemental guide member which extends above the upper edge of the box in order to guide the compression frames when in an elevated position with respect to the box and channel caps are also provided to prevent waste from being forced into the upper portion of the channels during use.

10 Claims, 2 Drawing Sheets

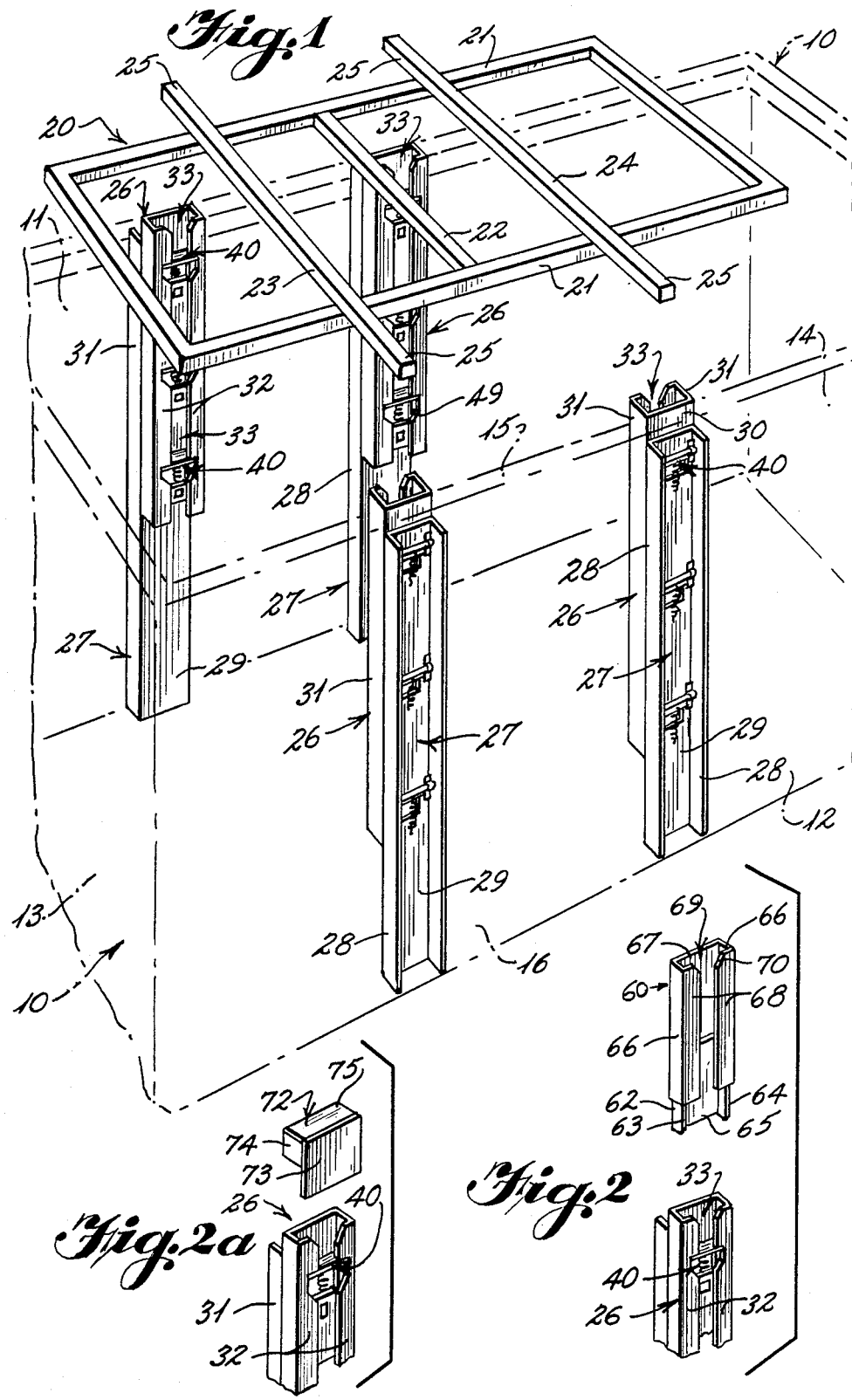

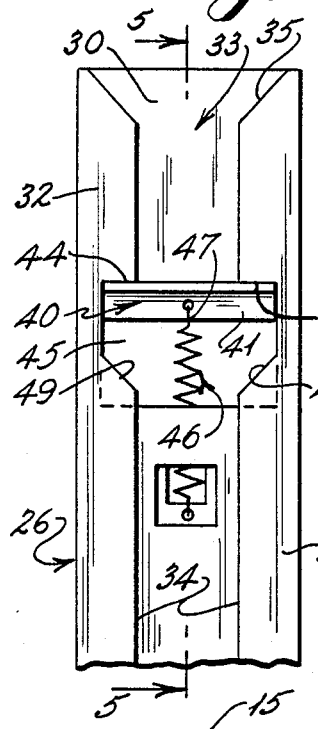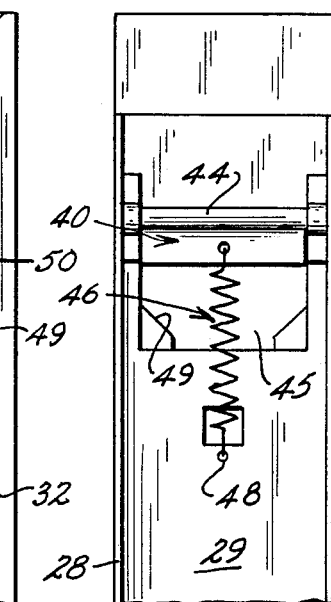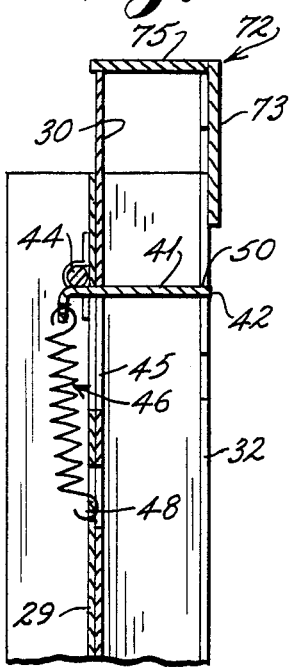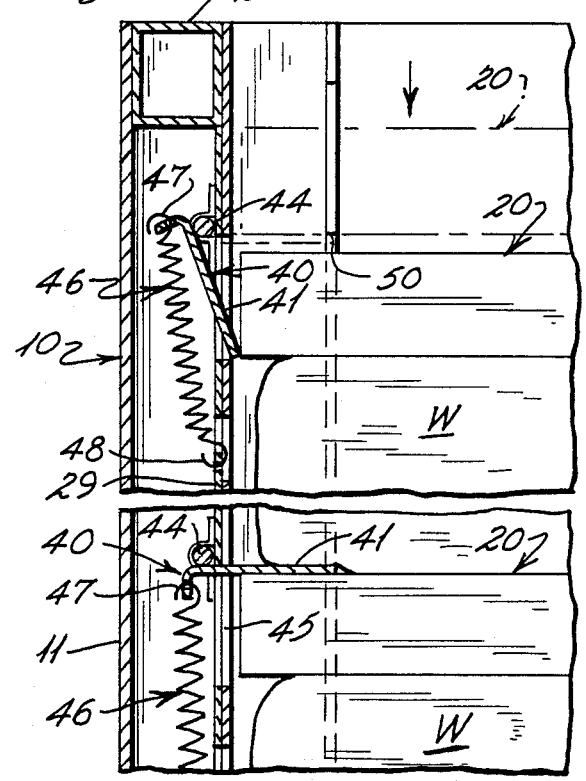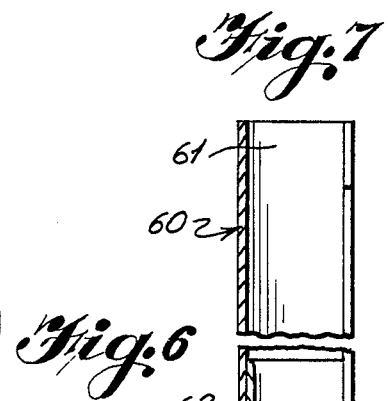

WASTE CONTAINERS HAVING COMPRESSED WASTE HOLD-DOWN MECHANISMS

BACKGROUND OF THE INVENTION

1. Field of the Invention

This invention is generally directed to containers for storing low level nuclear and other contaminated waste materials and particularly to waste containers having incorporated therewith compression frames for compacting the waste material into one or more compressed layers within the containers wherein each of the compression frames are locked within guide channels disposed within the containers by positively biased locking mechanisms located at spaced elevations along the channels.

2. History of the Prior Art

With the increasing use of nuclear fuels as sources of power, together with the increasing experimentation utilizing nuclear source materials, there is an evergrowing problem relating to the disposal not only of the high level nuclear waste material but of low level nuclear waste materials including containers, protective clothing, cleaning utensils, instruments and the like. In disposing of low level nuclear waste and other contaminated materials, use has been made of various sizes of sealed containers which are designed to be non-reusable so that once the containers have been filled with the contaminated materials, they cannot be opened by persons trying to tamper with the containers or by accident such as being dropped or mishandled during transportation from a filling station to a disposal site.

In recent years, a growing use has been made of generally rectangular metallic containers which are formed having a separate lid which may be secured to the body of the container by special clips, welding or otherwise secured so as to be non-removable once in place. Generally, the size of these rectangular containers permit approximately four or more cubic yards of loose debris or waste to be housed within each container. One example of a non-reusable, sealed waste container is disclosed in U.S. Pat. No. 4,426,927 to Lyndon M. Teague.

One of the primary concerns involved with the disposal of contaminated waste material such as low level nuclear waste is in locating adequate disposal sites wherein such material may be stored, buried or otherwise contained without fear of endangering the general public or environment. Site selection must therefore be made dependent upon population densities, soil conditions, stability of the terrain in the surrounding area, moisture levels and the like. Because of the material involved, nuclear or other contaminated waste disposal sites are limited in number and the use of the space within such sites must be accomplished in such a manner as to be obtain an optimum of burial or storage capacity. Further, the handling of contaminated waste products adds significantly to the costs with respect to the use of such items and therefore, the less material or containers that must be handled to effectively dispose of a given amount or volume of waste material, the more efficient and cost effective will be the method of disposal.

Therefore, in the handling of low level nuclear and other contaminated waste materials, there are two primary considerations which should be born in mind in order to more effectively reduce disposal costs. These considerations are to minimize the amount of handling involved in the disposal process and to maximize the efficient use of the storage capacity of the waste containers so as to minimize the amount of storage or burial space required for a given amount of waste materials.

To increase the efficiency of large, metallic contaminated waste dispensers, use has been made of compacting mechanisms to force the waste materials into compressed areas within the containers thereafter retaining the waste by means of frames positioned within the containers. Reference is made to U.S. Pat. No. 4,426,927 to Lyndon M. Teague in which is disclosed a compaction frame for use with metallic waste containers wherein the frame is guided within the containers by guide channels positioned vertically therein. As the frames are positioned within the channels and urged downwardly therein, the portions of the frame within the channels pass beyond yieldable cut-outs made within the channels. The cut-outs normally extend inwardly of the channel but flex outwardly as the frame member passes downwardly through the channel. After the frame member has passed each yieldable member, the inherent resiliency of the metal from which the channels are made allows the members to return or flex inwardly of the channels thereby preventing the withdrawal of the frames therefrom.

Through use, however, it has been determined that the formation of yieldable locking members integrally with the channel members creates locking projections which oftentimes fail as such members do not flex inwardly enough to prevent the withdrawal of the compression frame after it has been forced into place. This problem is especially true when the compression forces are increased thereby resulting with more force being placed on the frame and on the yieldable locking members by the compressed materials.

In addition to the foregoing, problems have arisen with the contaminated waste within the container becoming lodged within the guide channels or within the openings where the yieldable locking members are located. The trash or contaminated waste within the channels prevents the effective operation of the locking means and oftentimes requires a realignment of the frame or a removal of the frame in order to clear the channels so as to permit the proper operation and placement of the compression frame being used. Again, with reference to the aforementioned patent to Teague, U.S. Pat. No. 4,426,927, it should be noted that generally more than one frame is utilized per waste container. In this manner, the waste material within the containers may be successively compressed thereby permitting one container to hold as much of the waste material as would be otherwise stored in as many as seven non-compacted containers.

SUMMARY OF THE INVENTION

This invention is directed to contaminated waste containers having compression frame hold-down mechanisms provided therewith wherein the hold-down mechanisms are located along guide channels in which the compression frames are guided down into a compressing relationship with waste within the container. The hold-down mechanisms extend inwardly of the guide channels and are spring-loaded or positively biased so as to be yieldable in one direction as the compression frame member passes thereby and which are thereafter automatically returned to a blocking or locking relationship within the channel so as to positively insure that the frames cannot be removed from the guide channels. In addition, each of the channels may be provided with a supplemental channel portion which extends vertically above the upper edge of the waste container so as to define a positive guide above the container to facilitate the placement of the compression frame and the guiding of the frame even when the amount of waste within the container is piled above the upper edges thereof. In order to prevent the waste material from interfering with the guide channels or the container frame or compression frame hold-down mechanisms, removable end caps may be placed over the upper portions of the channels or the extended or supplemental portions thereof in order to provide a closed cap to prevent trash or other waste from entering the channels.

It is a primary object of the present invention to provide a compression frame compacting mechanism for use with bulk contaminated waste disposal containers wherein one or more frames may be positively guided within channels which extend into the containers and which frames are locked within the channels by positively biased locking mechanisms which operate to permit the frames to be moved in a single direction along such channels and which positively prevent the frames from being removed therefrom in the opposite direction.

It is another object of the present invention to provide compacting frame hold-down mechanisms for use with bulk contaminated waste containers wherein two or more of such frames may be utilized within a single container in order to compress the volume of material therein into ratios of at least approximately seven to one with respect to the normally filled volume achieved when non-compacting the material contained in the containers.

It is yet a further object of the present invention to provide locking mechanisms for use with compression frames utilized in waste containers wherein the locking mechanisms are housed within confined channels which are spaced from the waste material within the containers so that such mechanisms will not be clogged by the waste material being compacted.

It is also an object of the present invention to provide a compression frame guide and hold-down mechanism for use with bulk waste containers wherein supplemental channels are provided to enable the frames to be positively guided in elevated relationship with respect to the upper portion of the containers so that waste material may be piled above the upper edge of the containers and thereafter compressed inwardly of the containers with the compression frames being positively guided by such supplemental channels.

It is still a further object of the present invention to provide removable caps or closure means for blocking the upper portions of the guide channels used in bulk compression waste containers utilizing compression frames therein wherein the removable caps may be selectively utilized to cover the upper ends of the compression frame guide or channels to thereby prevent the placement or entanglement of waste material within the guide channels.

BRIEF DESCRIPTION OF THE DRAWINGS

FIG. 1 is a perspective assembly view of a waste container incorporating the compression frame guide channels or hold-down mechanisms of the present invention wherein the compression frame is shown in elevated position with respect to the guide channels and with the container being shown in dotted line so as to enable the view to disclose the placement and relationship of the guide channels and hold-down or locking mechanisms therein.

FIG. 2 is a reduced assembly view showing the upper portion of a single guide channel into which a supplemental vertically extending guide channel member may be readily inserted for guiding the compression frames at positions in vertically spaced relationship with respect to the upper edge of a waste container.

FIG. 2a is a partial perspective assembly view of the upper end portion of the channel member of FIG. 2 showing the waste material deflection cap being positioned for mounting with respect thereto.

FIG. 3 is a partial front plan view of the upper portion of the guide channel and locking mechanism shown in FIG. 2.

FIG. 4 is a rear plan view of the upper portion of the guide channel and locking mechanism shown in FIG. 2 wherein the spring means is shown as being attached to the locking plate which extends within the channel.

FIG. 5 is a cross sectional view taken along lines 5—5 of FIG. 3.

FIG. 6 is a partial cross sectional view of a container showing the guide channels and locking mechanism and illustrating the movement of a compression frame member wherein the locking mechanism is shown as being urged inwardly with respect to the guide channel in full line and is automatically returned to a locking horizontal relationship with the frame as shown in the dotted line position FIG. 7 is a partial cross sectional view of the upper portion of the guide channel and locking mechanism shown in FIG. 2 wherein the supplemental vertical extension channel is positioned therein.

DESCRIPTION OF THE PREFERRED EMBODIMENT

With continued reference to the drawings, a generally conventionally designed low level contamined metallic waste container 10 is shown generally in dotted line in FIG. 1 as having side walls 11 and 12, end walls 13 and 14, bottom wall or floor 16 and a separate lid portion (not shown). The lid is of a size to securely engage and overlay the upper flanged edge 15 of the container and is locked thereto by welding, bolting or other securing means so as to be non-removably attached thereto after waste material has been placed within the container.

Although the shape of the container is shown as being generally rectangular in configuration, it should be noted that other configurations such as cylindrical or square containers could also be used and incorporate the various components of the present invention. It is preferred that the components of the invention be made of a metallic material so that the compressive forces created during the use of a compactor mechanism within the container may be adequately resisted without equipment failure.

In order to compress waste material W within the containers 10, separate compression frames 20 are forced downwardly within the container 10 by suitable presses or hydraulic or pneumatic rams (not shown). The frames 20 are of a size to be guidingly received within the containers 10. As shown in FIG. 1, each compression frame includes a generally rectangular outer tubular portion 21, a central brace 22 and a pair of intermediately spaced and outwardly extending braces 23 and 24 which have guiding end portions 25 which are receivable within guide channel members 26 which are secured within the interior of the containers. The central and intermediate braces 22 and 23, respectively, are welded or otherwise securely fastened to the outer portion 21 of the compression frame so as to thereby reinforce the frame and to serve as a substantially integral portion thereof.

As the compression frames 20 will be utilized to force waste materials W into a compressed state within the waste containers, it is necessary to provide the guide channel members 26 to insure that each frame is properly oriented within a container during its compressive or vertical movement with respect thereto. To accomplish the necessary guiding features, the drawings show a pair of spaced vertically extending and generally parallel guide channel members 26 which are secured such as by welding to each of the side walls 11 and 12 of the container. Although two pairs of guide channel members 26 are shown in the drawings, it should be noted that additional guide channels and associated locking members could be utilized both along the side and end walls of the container. When additional guide channel members are utilized, the compression frame 20 would be modified so that additional outer guiding ends 25 would be provided to extend into an aligned relationship with the additional guide channel members being utilized. In addition, for smaller containers or for frames having additional reinforcing, it may be possible to use only a single guide channel member along the interior of each of the opposing side or end walls 11 and 12 or 13 and 14, respectively.

Each of the guide channel members 26 is secured to the inner walls of the container by means of elongated secondary spacer channels 27 which extend from adjacent the floor 16 of the containers to a point spaced below the upper edge 15 thereof. The spacer channels 27 are shown as having elongated side wall portions 28 and an intermediate connecting outer wall portion 29. The outer wall portion 29 of the channels 27 is maintained in spaced relationship with respect to the side walls of the containers by the side walls 28 so as to provide an enclosed area therebetween for purposes of which will be discussed in greater detail hereinafter.

The guide channel members 26 are shown as being welded or otherwise secured in back to back relationship with respect to the channels 27 and extend from a point spaced vertically above the floor 16 of the containers to a point generally adjacent to the edge portion 15 thereof. Each of the guide channel members includes an inner wall or backing plate 30 which is integrally connected to a pair of spaced side flanges 31. A pair of inwardly extending flange portions 32 extend from the elongated side walls 31 of the guide channel member 26 and form an elongated slot or opening 33 therebetween. The opening 33 is defined having a width which is generally just slightly greater than the width of the extension members 25 of the compression frame 20 so as to enable the extension members to be slidingly received therein. The inner edges 34 of the spaced flanges 32 define a restrictive guide surface for insuring the proper alignment of the compression frame within the guide channel members as the frame is vertically moved within the waste containers. The uppermost portion of the flange portions 32 may be bevelled as shown at 35 so as to assist in the initial placement of the outwardly extending portions 25 of the extension frames within the openings or slots 33.

To insure that the compression frame 20 is retained at a proper vertical orientation with respect to the height or depth of a waste container as waste material is compressed therein, a plurality of vertically spaced locking members 40 are provided along the length of the guide channel members 26. Although three such locking members 40 are shown in use with the guide channel members 26 shown in the drawings, either fewer or additional locking members may be utilized as necessary to obtain the most efficient compaction of material within a given container.

Each of the locking mechanisms 40 includes a vertically movable locking plate or latch 41 having an outermost end 42 and an inwardly extending end 43. The locking plate or latch is pivotable about a pin 44 which is secured within the spacer channel 27 adjacent the outermost wall 29 thereof. Aligned openings 45 are provided through both the outer wall 29 of the channel 27 and the inner wall 30 of the guide channel member 26 so as to allow for the passage of the inner end 43 of the locking plate or latch 41 therethrough. The locking plate is operable by a spring 46 which is connected with one end 47 being attached to the inner end 43 of the locking plate and the remote end 48 thereof being disposed in vertical relationship therewith and attached to the outer walls 29 of the channels 27.

As shown in FIGS. 5 and 6, the outermost end 42 of the locking plate or latch 41 extends into general alignment with the inwardly extending flanges 32 defining the guide opening or slot 33 therebetween. Further, as shown in FIG. 3, each of the edges 32 defining the guide opening may be notched as shown at 49 so as to provide a pair of abutment walls 50 which engage the outermost end 42 of the locking plate 41 to prevent any additional vertical displacement of the locking plate within the channel member 26. Normally, the spring element urges the outermost end of the locking plate into the horizontal position shown in FIG. 5 wherein the outermost end engages the abutment walls 50 defined by the spaced side walls 32.

As shown in FIG. 6, as the guide end portions 25 of the compression frames are urged vertically within the slots or channels defined by the guide channel member 26, the guide end portions will initially engage the locking plates or latches 41 forcing such plates vertically downwardly pivoting the same about the pin 44. The openings 45 created through the channels 26 and 27 are made small enough to insure that the locking plates or latches 41 will not pivot completely therethrough but will be blocked by the lower edge 50 thereof as shown in FIG. 6. This feature of the construction will prevent waste material or trash from entering through the openings 45 and otherwise potentially fouling or jamming the locking mechanisms between the side walls of the container and the channel members 26.

Once the frame has been forced vertically beyond a locking plate or latch 41, the tension on the spring element 46 will force the latch member to rotate about its pivot bringing the latch into horizontal alignment with the end portion thereof engaging the abutment walls 50 as shown in dotted line in FIG. 6.

As previously mentioned, various numbers of locking mechanisms 40 may be utilized within the waste containers of the present invention. It is important to insure that the same of number of locking mechanisms are utilized in each guide channel member 26 with the vertical spacing being the same in each guide channel. In this manner, the locking elements will retain the compression frames 20 at a uniform vertical orientation within the container as the frames are driven into compressed relationship therewith by ram elements directed downwardly from the top of the containers. It is generally preferred that the lowest set of locking mechanisms be located approximately at an elevation equal to 40% of the height of the side walls of the containers with the second lowermost locking elements being spaced at a point approximately ⅔ of the height of the walls and with the upper locking mechanisms being located generally just below the upper edge portion 15 of the containers.

During the loading of waste containers utilizing compression frames therein, it is necessary to pile the waste material above the edges 15 of the containers. When piled above the upper edges of the containers, the waste material may be forced outwardly of the container when the compression cycle begins and oftentimes creates a situation where waste material may be forced into the upper portion of the guide channels 26 thereby blocking the channels and prohibiting the entrance of the compression frame therein. In order to avoid this problem, the present invention incorporates supplemental guide channel elements 60 which are adapted to be received within the uppermost portion or ends of the guide channel elements 26. The supplemental guide channels extend upwardly beyond the uppermost edge of the containers as shown in FIGS. 2 and 7. Each of the supplemental channel members are generally C-shaped in cross section and include upper and lowermost portions 61 and 62. The lower portion has side walls 63 and 64 and rear wall 65 and is slidingly received within the inner portion of the guide channels 26. The uppermost portions 61 of the extension members include side walls 66, rear walls 67 and spaced side flanges 68 which extend upwardly beyond the edge 15 of the containers. An elongated slot 69 is created between the side flanges 68 which elongated slot or opening is aligned with the opening 33 created between the flanges 32 of the guide channel element 26. Again, the uppermost edge portions defining the guide channel may be bevelled as shown at 70 in order to assist in the alignment of the guide end portions 25 of the compression frame within the slots 69. When utilizing the supplemental extension members, such members are initially placed so as to extend in aligned relationship with the guide channel members 26. Thereafter the waste material is piled above the edge of the container. The compression frames are then placed within the upper portion of the slot 69 of the extension members and thereafter, appropriate ram or press means utilized to drive the frame downwardly through the extension members and into the normal guide channel slots 33. Thereafter, the extension members may be removed for use at a future time.

Another problem which is inherent in the use of guiding channels within compression waste containers is that some of the waste material frequently is urged into the upper portion of the guide channels during loading and compaction of waste within the containers. To prevent this jamming or clogging of the guide channels 26, removable end caps 72 are normally provided in sliding and covering relationship with the upper portion of the guide channels. As shown, each of the covers or end caps includes an outer plate 73, a pair of spaced side members 74 which overlay the side wall portions 31 of the guide channels 26 and an upper plate 75 which covers the opening or slot between the inwardly extending flanges 32 and the inner wall 30 of the guide members. The end caps are removed prior to placing the compression frame within the end portion of the channels and are replaced when additional waste material is to be loaded into the container but prior to the compression cycle.

Although the preferred embodiment and drawings show the container being loaded through an opened top, it should be noted that the container could be loaded through an opened end, side or bottom wall as well. In any case, the guide channels should be oriented so as to extend perpendicularly to and from adjacent the opened wall section.

We claim:

1. In a waste storage container which includes a body portion having a bottom wall, opposing inner surfaces and an opened upper end and which has at least one compression frame having at least two guide bar means extending outwardly on opposite sides thereof toward the opposing inner surfaces of the container, the improvement comprising at least first and second guide channels disposed in oppositely oriented relationship with one another along the opposing inner surfaces of the container and which extend from adjacent the upper end toward the bottom wall of the container, each of said first and second guide channels defining an elongated opening in which the guide bar means of the compression frame are slidingly received, at least one locking means mounted to each of said guide channels and having elongated latch means extending into said elongated openings therein, said latch means being yieldably mounted within said guide channels so as to be displaced within said elongated opening when the guide bar means of the compression frame are moved in a direction inwardly of the container opening thereby permitting the guide bar means to pass in proximate relationship thereto, said locking means including return means connected to said latch means, said return means constantly urging said latch means into said elongated openings in said guide channels so as to normally block said elongated opening, and stop means for retaining said latch means within and generally perpendicular to elongated openings of said guide channels after the compression frame has passed inwardly thereof.

2. The invention of claim 1 including spacer means for mounting said first and second guide channels in spaced relationship with respect to said opposing inner surfaces of the container, each of said first and second guide channels being generally C-shaped in cross section and having a rear wall portion, side walls and flanged inner wall portions, said inner wall portions defining an elongated slot therebetween.

3. The invention of claim 1 in which said stop means includes a cut out opening in said flanged inner wall portions of each of said first and second guide channels, said cut out openings having outwardly extending edge portions being engaged by said latch means when said latch means are extended perpendicularly across said elongated openings of said first and second guide channels.

4. The invention of claim 2 in which each of said latch means includes a generally planar plate means having an outer end extending across said elongated openings of said first and second guide channel and an inner end extending through an opening in said rear wall portion of said first and second guide channels, means for pivotally connecting said inner end of said plate means rearwardly of said opening and spring means positioned rearwardly of said rear wall portion of said one of first and second guide channels for urging said plate means into perpendicular relationship across said elongated opening.

5. The invention of claim 4 including at least two vertically spaced locking means within each of said first and second guide channels.

6. The invention of claim 1 including a supplemental guide channel member mounted to each of said first and second guide channels, each of said supplemental guide channels having a base portion which is selectively aligned in linear relationship with said first and second guide channels and having a second end portion extending upwardly therefrom so as to extend outwardly of the container, said supplemental guide channels having second openings therein which are aligned with said elongated openings in said first and second guide channels.

7. The invention of claim 1 in which each of said first and second channels includes an upper end adjacent the upper end of the container, cap means for selectively closing said upper end of said first and second guide channels, each of said cap means having a base portion for engaging said guide channel means and upper portion for covering the access to said elongated openings in said first and second guide channels, said cap means being selectively removable so as to permit the guide bar means of the compression frame to be inserted into said first and second guide channels.

8. A waste storage apparatus comprising a container having a substantially closed body portion defined by opposing inner side walls, said container being opened at the upper end thereof in order to receive waste material therein, at least one compression frame member having guide bar means extending outwardly therefrom toward said opposing inner side walls of said container, at least first and second pairs of guide channels disposed in oppositely oriented relationship with one another along said opposing inner side walls of said container and extending from an uppermost end adjacent said upper end of said container to a point inwardly of said container opening, each of said guide channels being generally C-shaped in cross section and defining an elongated opening in which said guide bar means of said compression frame are slidingly received, at least two locking means mounted within each of said guide channels, each of said locking means having a generally planar latch plate extending into said elongated openings in said guide channels, each of said latch plates being yieldably mounted within said guide channels so as to be displaced therein when the guide bar means of said compression frame are moved in a direction inwardly of said container opening so as to permit the guide bar means to pass beyond said latch plates, return means connected to each of said latch plates and mounted between said guide channels and said side walls of said container so as to be spaced from said elongated openings, said return means constantly urging said latch plates into said elongated openings, and stop means for retaining said latch plate within said elongated openings and substantially perpendicular thereto after each compression frame has passed inwardly thereof.

9. The invention of claim 8 including a supplemental guide channel member selectively mounted to said uppermost end of each of said first and second pairs of guide channels, each of said supplemental guide channels having a base portion which is selectively seated to said uppermost end of said guide channels and having a second end portion extending upwardly therefrom so as to extend outwardly of said container, said supplemental guide channels having second openings therein which are aligned with said elongated openings in said first and second pairs of said guide channels.

10. The invention of claim 8 including cap means for selectively closing said uppermost end of said first and second pairs of guide channels, said cap means being selectively removable so as to permit said guide bar means of said compression frame to be inserted into said first and second pairs of guide channels.

* * * * *